United States Patent
Eisinger et al.

(10) Patent No.: US 11,214,444 B2
(45) Date of Patent: Jan. 4, 2022

(54) DRIVE DEVICE, DRIVE ELEMENT AND CONVEYING-CART DRIVE

(71) Applicant: Interroll Holding AG, Sant' Antonino (CH)

(72) Inventors: Thomas Eisinger, Waibstadt (DE); Heinrich Droste, Sinsheim (DE)

(73) Assignee: Interroll Holding AG

( * ) Notice: Subject to any disclaimer, the term of this patent is extended or adjusted under 35 U.S.C. 154(b) by 145 days.

(21) Appl. No.: 16/623,823

(22) PCT Filed: Jun. 20, 2018

(86) PCT No.: PCT/EP2018/066420
§ 371 (c)(1),
(2) Date: Dec. 18, 2019

(87) PCT Pub. No.: WO2019/002048
PCT Pub. Date: Jan. 3, 2019

(65) Prior Publication Data
US 2021/0284457 A1 Sep. 16, 2021

(30) Foreign Application Priority Data
Jun. 30, 2017 (DE) .................. 10 2017 006 212.9

(51) Int. Cl.
*B65G 23/14* (2006.01)
*B65G 17/42* (2006.01)
(Continued)

(52) U.S. Cl.
CPC ............. *B65G 23/14* (2013.01); *B65G 17/42* (2013.01); *B65G 23/16* (2013.01); *B65G 39/14* (2013.01)

(58) Field of Classification Search
CPC ........ B65G 17/42; B65G 23/14; B65G 23/16; B65G 39/14
(Continued)

(56) References Cited

U.S. PATENT DOCUMENTS 2,868,356 A * 1/1959 Haaff .................... F16H 7/06
198/833
3,338,380 A * 8/1967 Grebe .................... B65G 39/02
198/822
(Continued)

FOREIGN PATENT DOCUMENTS

DE    2 044 400     3/1971
DE    31 16 714     11/1982
(Continued)

OTHER PUBLICATIONS

Korean Notice of Preliminary Rejection dated May 1, 2021.
(Continued)

*Primary Examiner* — Douglas A Hess
(74) *Attorney, Agent, or Firm* — Gerald E. Hespos; Michael J. Porco; Matthew T. Hespos

(57) ABSTRACT

A drive device (1) for a conveying cart of a conveying device contains a drive source (34) and a drive-force transmission (6) for transmitting a drive force of the drive source (34) to a drive element (2). The conveying cart can be fastened to the drive element (2) and the drive force can be transmitted to the drive element (2) from the drive-force transmission (6) by a force-locking or frictional-locking connection. A drive element (2) for the drive device (1) has a first long side (36) with ribs (38) and joints (40) transverse to the longitudinal direction of the drive element (2) for permitting negotiation of curves, and a second long side (42) opposite the first long side (36) is flat. A conveying-cart
(Continued)

drive (4) for a conveying cart of a conveying device contains the drive device (1) and the drive element (2).

9 Claims, 3 Drawing Sheets

(51) Int. Cl.
  *B65G 39/14* (2006.01)
  *B65G 23/16* (2006.01)
(58) Field of Classification Search
  USPC .......................................................... 198/833
  See application file for complete search history.

(56) References Cited

U.S. PATENT DOCUMENTS

| | | | | |
|---|---|---|---|---|
| 3,711,161 | A * | 1/1973 | Proctor | E02F 3/148 |
| | | | | 299/82.1 |
| 3,910,406 | A * | 10/1975 | Pulver | B65G 17/44 |
| | | | | 198/833 |
| 5,303,817 | A * | 4/1994 | Kissee | B65G 23/16 |
| | | | | 198/833 |
| 5,407,061 | A | 4/1995 | Okada et al. | |
| 5,445,081 | A * | 8/1995 | Kunczynski | B61B 9/00 |
| | | | | 104/165 |
| 6,129,350 | A | 10/2000 | St. Ours | |
| 6,481,567 | B2 * | 11/2002 | Layne | B65G 23/10 |
| | | | | 198/834 |
| 6,907,985 | B1 | 6/2005 | Axmann | |
| 9,545,160 | B2 * | 1/2017 | Mack | B66B 9/06 |
| 10,449,585 | B2 * | 10/2019 | Della Rossa | B21C 1/30 |
| 10,793,362 | B2 * | 10/2020 | Kou | B65G 15/32 |
| 10,822,174 | B2 * | 11/2020 | Hinterholzer | B65G 23/06 |
| 2014/0014468 | A1 | 1/2014 | Pilarz et al. | |

FOREIGN PATENT DOCUMENTS

| | | |
|---|---|---|
| DE | 692 19 860 | 12/1997 |
| DE | 102 39 215 | 6/2003 |
| DE | 603 03 428 | 10/2006 |
| EP | 0 629 566 | 12/1994 |
| EP | 1 034 924 | 9/2000 |
| EP | 1 375 390 | 1/2004 |
| JP | 7-9823 | 2/1995 |

OTHER PUBLICATIONS

International Search Report dated Oct. 31, 2018.
German Office Action dated Dec. 21, 2017.
Chinese Office Action dated Sep. 25, 2020.

* cited by examiner

DRIVE DEVICE, DRIVE ELEMENT AND CONVEYING-CART DRIVE

BACKGROUND

Field of the Invention

The invention relates to a drive device, a drive element and a conveying-cart drive for a conveying cart of a conveying device for conveying conveyed material.

Related Art

A conventional conveying-cart drive has a drive device for a conveying cart of a conveying device. The conveying cart usually is drawn by means of a known rubber block chain. Such conveying carts are equipped with a conveyor belt that is arranged and can be driven transversely to the conveying direction and preferably are used as revolving chains of carts in crossbelt sorters in order to receive and convey piece goods for high-performance distribution in mail processing and distribution centers. In this case, the drive side of the known rubber block chain has tooth spaces formed transverse to the driving direction. Corresponding teeth of a driving gear wheel or a toothed drive chain—driven by means of an electric motor—engage in the tooth spaces of the rubber block chain. The pressure side of the drive has multiple belts that wrap around two deflecting rollers and also has a pressure unit. To ensure the form-fit connection of tooth and tooth space, the pressure unit presses on the rubber block chain in the direction of the drive side by way of the multiple belts. In particular in order to permit negotiation of curves, the rubber block chain on the pressure side is formed alternately with lands and breaks transverse to the driving direction.

Such known solutions are usually heavy, maintenance-intensive, loud and expensive to produce. These disadvantages are predominantly due to the type of drive previously described, and result for example in the case of the driving gear wheel or the toothed drive chain from the relatively high weight thereof, the necessity of regular lubrication and/or a loud wheel noise thereof. In particular the large number of different parts arising from the type of drive contributes to the high costs.

To avoid these disadvantages, it is an object of the invention to make available an improved drive device for a conveying cart of a conveying device with which in particular the maintenance expense, the costs and the noise generation are reduced.

SUMMARY

One aspect relates to a drive device for a conveying cart of a conveying device, with a drive source and a drive-force transmission means for transmitting a drive force of the drive source to a drive element. The conveying cart for driving by means of the drive device can be fastened to the drive element. The drive force can be transmitted to the drive element from the drive-force transmission means by means of a force-locking or frictional-locking connection.

One advantage of this aspect is that because of the force-locking or frictional-locking transmission of force a driving gear wheel or a toothed drive chain having the adverse characteristics previously described can be dispensed with. Thus, the maintenance expense is reduced owing to the associated omission of the regular lubrication thereof. Further, the sought reduction in noise and costs is yielded.

One further advantage of this aspect is that the frictional-locking drive device can be made smaller, in particular narrower transverse to the conveying direction, than a conventional form-fitting drive device.

The drive device for the conveying cart of the conveying device may be a device for driving the conveying cart of the conveying device, by means of which the conveying cart can be advanced in the conveying device, in order for example to transport conveyed material on the conveying cart from a starting location to a destination.

The conveying cart of the conveying device may have a conveying plane formed substantially perpendicularly to a direction of gravity for transporting the conveyed material. The conveyed material can be deposited on the plane and, due to the gravitational force acting on the conveyed material, can be transported by the conveying cart. The conveying cart may have a cross-belt conveyor for conveying conveyed material in a direction transverse to the conveying direction of the conveying device.

The conveying device may comprise one or more conveying carts and one or more drive devices for the conveying cart or carts for transporting conveyed material in a conveying direction.

For example an electric, hydraulic or electrohydraulic drive source may be used as a drive source of the drive device.

The drive-force transmission means for transmitting the drive force of the drive source to the drive element may be a suitable means with a friction surface that is sufficient for transmitting the drive force of the drive source to the drive element by means of force-locking or frictional-locking connection. The drive-force transmission means may contain at least one friction belt and/or at least one friction wheel.

The drive element may be an element suitable for force-locking or frictional-locking transmission of force, with the drive element having in particular sufficient stability to draw one or more conveying carts. The drive element may be a rubber block chain adapted to these requirements.

A force-locking or frictional-locking connection requires a normal force on the faces that are connected in force-locking manner or in frictional-locking manner. Relative movement of the faces is prevented if there is a sufficient normal force and/or a sufficient coefficient of friction for static friction of the faces that are connected in force-locking manner or in frictional-locking manner.

Other types of connection are a form-fit or cohesive connection. The form-fit connection is produced by the engagement of at least two connecting elements into one another. In principle, the form-fit connection persists even in the event of the transmission of force being interrupted. The cohesive connection is produced by the connecting elements being held together by atomic or molecular forces. It is in principle a non-detachable connection that can be severed for example by destroying the connection means.

Advantageously, the drive-force transmission means is a belt drive that has a gap formed between a drive belt and a pressure belt, in which gap the drive element can be clamped for driving or can be pressed against the drive belt. Thus a normal force can be applied to produce or ensure the force-locking or frictional-locking connection between the drive belt and drive element.

In particular, the drive belt and/or the pressure belt together with the drive element may have a high coefficient of friction for static friction. For example, the coefficient of friction for static friction between the drive belt and the drive element and/or between the pressure belt and the drive element is approximately between 0.4 and 0.6 or between approximately 0.3 and 0.7.

In particular, the coefficient of friction for static friction between the drive belt and the drive element and/or between the pressure belt and the drive element may be approximately 0.9, which can be achieved for example by means of a coating applied, in particular vulcanized on or glued on, to the drive belt and the pressure belt. Preferably, the coating may have a hardness of approximately 55° to 70° Shore A.

Advantageously, the drive-force transmission means has a drive side and a pressure side. The drive side advantageously contains a drive roller, a deflecting roller, a drive belt that wraps around the drive roller and the deflecting roller, and a counter-pressure means with counter-pressure rollers. The pressure side advantageously contains two deflecting rollers, a pressure belt that wraps around the deflecting rollers and a pressure means with pressure rollers.

In particular, the pressure means and the counter-pressure means may be arranged lying opposite one another. For example, in this case the pressure means may be arranged between the deflecting rollers and the counter-pressure means may be arranged between the drive-side deflecting roller and the drive roller. The drive belt may in this case run around the drive roller, the counter-pressure means and the drive-side deflecting roller. The pressure belt may in this case run around the pressure-side deflecting rollers and the counter-pressure means.

In particular, the drive device, owing to the force-locking or frictional-locking transmission of force to the drive element, may be embodied with two halves of symmetry formed approximately axially symmetrically to each other. For example, the drive side and the pressure side may be formed approximately axially symmetrically to each other. The axis of symmetry, when viewed substantially transverse to the driving direction, may lie for example approximately in the middle of the gap formed between the drive belt and the pressure belt.

Thus, identical parts can increasingly be used when manufacturing the parts of the drive device. As a result, for example time and/or costs can be saved in manufacturing the parts of the drive device and/or stocking of the parts of the drive device can be simplified. Further, a number of tools of the drive device that are required for maintenance can be reduced.

In particular, the pressure rollers can be formed to be adjustable in order to reduce the gap between the pressure belt and drive belt in an adjusting manner.

Thus, the normal force for producing or ensuring the force-locking or frictional-locking connection between the drive belt and drive element can be adjusted.

In particular, the counter-pressure rollers of the counter-pressure means may be formed with a fixed axial distance from the drive-side drive roller.

Thus, with the counter-pressure means a fixed counterpart to the pressure means is provided, by means of which the normal force which can be applied by the pressure means by way of the pressure rollers can be absorbed. This further contributes to producing or ensuring the force-locking or frictional-locking connection between the drive belt and drive element.

For example, the pressure rollers of the pressure means may be formed without grooves, i.e. be formed with a substantially flat surface.

Thus a lesser travelling resistance can be yielded owing to lesser pressing of the pressure rollers into the drive element.

In particular, the pressure means and/or the pressure rollers of the pressure means may be formed to be adjustable against a spring force for variably decreasing the gap between the pressure belt and drive belt.

Thus, a restoring force of the pressure means and/or the pressure rollers can be applied to enlarge the gap between the pressure belt and drive belt. For example, the spring force may be obtained by means of a plate-spring assembly. Thus a low space requirement for achieving the spring force can be realized.

Advantageously, the drive belt and the pressure belt are formed as multi-rib belts. Thus, large forces can be transmitted while having a low height of the drive belt and of the pressure belt. For example, the multi-rib belt may be formed as what is called a poly-V belt, in particular with a wear-resistant back.

Advantageously, the drive device may also comprise two drive sources. Thus failure of a drive source can be compensated for.

In this case, the second drive source may additionally be provided on the pressure side, with then a drive roller around which a drive belt is wrapped and a deflecting roller being provided on the pressure side. Thus, the drive element can be driven symmetrically by two drive belts.

For example, the drive source may be an electric motor, in particular a bevel gear motor.

For example, path tracking for the conveying cart driven by the drive device described can be realized by means of an incremental encoder. In particular, the incremental encoder may be provided on the non-driven side, i.e. on the pressure side. Thus reliable measurement can be guaranteed because corruption of the measurement which might otherwise be possible owing to drive slip occurring on the drive side, in particular on the drive belt, does not occur.

The drive slip that occurs can be detected by a slip monitoring means. The slip monitoring means may supply an input variable for a control loop of the drive control. If increased drive slip is detected, a malfunction report can be issued and thus a possible malfunction can be recognized early on. For example, a motor speed or a deviation of an actual motor speed from a desired motor speed can be detected by means of a rotary transducer on a gear output shaft or on a motor shaft (for example integrated in the motor) or by means of a proximity switch on the deflecting roller.

In particular, the conveying cart may be able to be fastened to the drive element by a fastening means. For example, the fastening means may have at least one articulation which permits one or more degrees of freedom. Thus horizontal and/or vertical negotiation of curves by the conveying cart which is driven by the drive device described can be compensated for and reliable driving of the conveying cart can be guaranteed.

Advantageously, plural drive devices are provided in the conveying device at predetermined distances from one another. Thus a necessary drive power can be distributed to a plurality of drive devices and/or more uniform loading of the drive element can be achieved.

For example, the distance between two drive devices may be approximately 30 to approximately 100 m or approximately 50 to approximately 70 m.

The distances between the drive devices may be regular.

Alternatively or additionally, the distances between the drive devices may be irregular.

In particular, the distances between the drive devices may be selected dependent on a tensile force on the drive element.

For example, the drive device may be arranged at a point at which a low tensile force prevails in the drive element.

Alternatively or additionally, the drive device may be arranged at a point at which the lowest tensile force prevails in the drive element.

Advantageously, a number of the drive devices in a conveying device is designed such that the conveying device can also be operated with one drive device less. Thus if one of the drive devices fails because of a defect or a repair or maintenance, the conveying device can continue to be operated.

In particular, the drive device may possibly be designed so that it can be lowered for repair and/or maintenance purposes, for example by means of threaded rods. Thus the conveying device can continue to be operated once lowered, since the conveying device because of the advantageous arrangement and/or design of the drive devices described above, can also be operated with one drive device less. Thus downtimes of the conveying device for repair and/or maintenance on one of the drive devices can be shortened.

Another aspect relates to a drive element for a drive device for a conveying cart of a conveying device. A first long side of the drive element of one embodiment is formed with transverse ribs and transverse joints oriented transversely to the longitudinal direction of the drive element for permitting negotiation of curves, in particular for compensating for extension and/or compression of the drive element. A second long side formed opposite the first long side may be substantially flat or smooth-surfaced.

The second long side of the drive element described that is substantially flat offers advantages in particular in the case of a force-locking or frictional-locking transmission of force by a force transmission surface, which is enlarged for this, compared with conventional drive elements for a form-fitting transmission of force.

Advantageously, at least one receptacle for the fastening means, described above, for the conveying cart is formed on the drive element. Thus reliable driving of the conveying cart by means of the drive element described and the drive device described above is made possible.

In particular, plural receptacles may be spaced apart from each other in the longitudinal direction of the drive element, and fastening means may be formed on the drive element for fastening a plurality of conveying carts.

For example, the receptacle for the fastening means may be formed as a fastening hole or as a plurality of fastening holes in one of the transverse ribs of the drive element. The fastening hole or holes may run substantially transverse to the longitudinal direction of the drive element.

In particular, the drive element may have an approximately rectangular cross-section.

The drive element may be formed with an internal reinforcement that may for example contain at least one cable or one woven fabric made of steel or plastics material. Thus a tensile strength of the drive element can be increased.

Advantageously, the drive element is formed as a rubber block chain.

For example, the rubber block chain may be formed as an endless chain.

Alternatively, the rubber block chain may be lockable with a lock, or the free ends thereof may be connected together to form a closed rubber block chain.

Alternatively, the drive element may be formed as a metal link chain.

In this case, the metal link chains known from the prior art or newly configured metal link chains may be used. In particular, the metal link chain may contain elements produced at least in part from metal and/or plastics material.

The metal link chain has a large number of individual metal links which are connected together such that pivoting of the metal links relative to each other in the horizontal or a substantially horizontal plane is permitted in order to permit the conveying carts to negotiate curves.

In particular, the metal links may, additionally to this, be connected together such that pivoting of the metal links relative to each other in the vertical plane or a substantially vertical plane is permitted in order to permit uphill and downhill running of the conveying carts.

In this case, the metal link chains or the metal links suitable for the proposed drive must have a drive portion which can be clamped in the gap of the drive-force transmission means formed as a belt drive for driving or can be pressed against the drive belt.

The drive portion may preferably be formed as a part or metal part extending in one direction, i.e. downwards in the operating position, and in this respect project from the metal link chain and be formed approximately in the manner of a boat's keel which in the operating position of the metal link chain protrudes downwards into the gap of the belt drive.

When using a metal link chain, the same advantages are yielded as are described in the context of the disclosure relating to the rubber block chain. The use of a metal link chain in conjunction with the proposed driving on one side or on both sides by means of the drive-force transmission means or drive device disclosed is in particular advantageous.

One further aspect relates to a conveying-cart drive for a conveying cart of a conveying device, with the above-described drive device and the above-described drive element. The drive element can be driven by means of the drive device and wherein the second long side of the drive element for driving the drive element faces the drive belt of the drive device.

Thus the enlarged force transmission surface previously described can be used for the force-locking or frictional-locking transmission of force from the drive belt to the drive element of the drive element described, and thus a reliable conveying-cart drive can be achieved.

Below, an exemplary embodiment of the conveying-cart drive according to the invention with the drive device according to the invention and the drive element according to the invention is explained in greater detail with reference to drawings.

DETAILED DESCRIPTION

Figure 1:
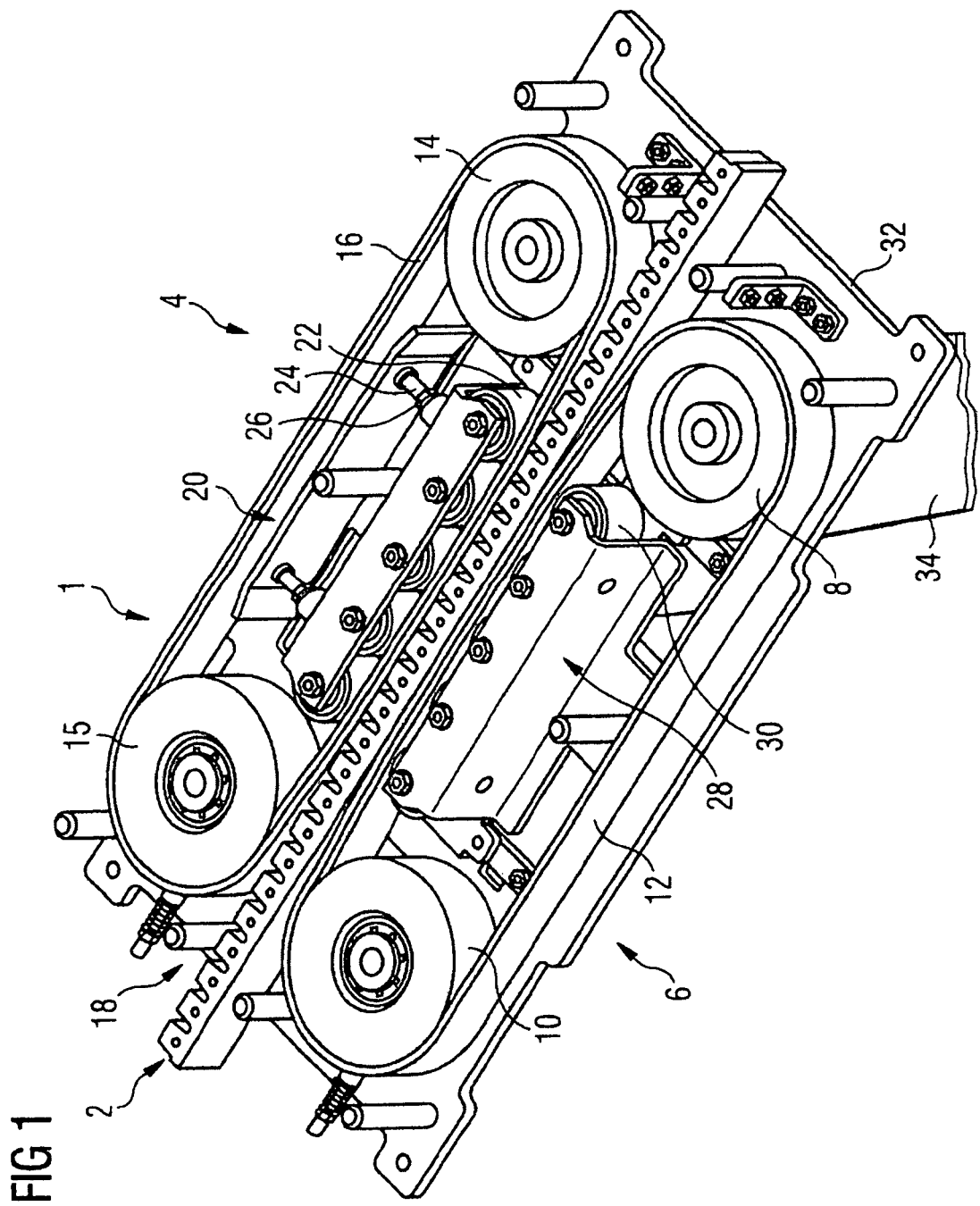
FIG. 1 is a spatial top view of a conveying-cart drive according to one exemplary embodiment of the invention.
Figure 2:
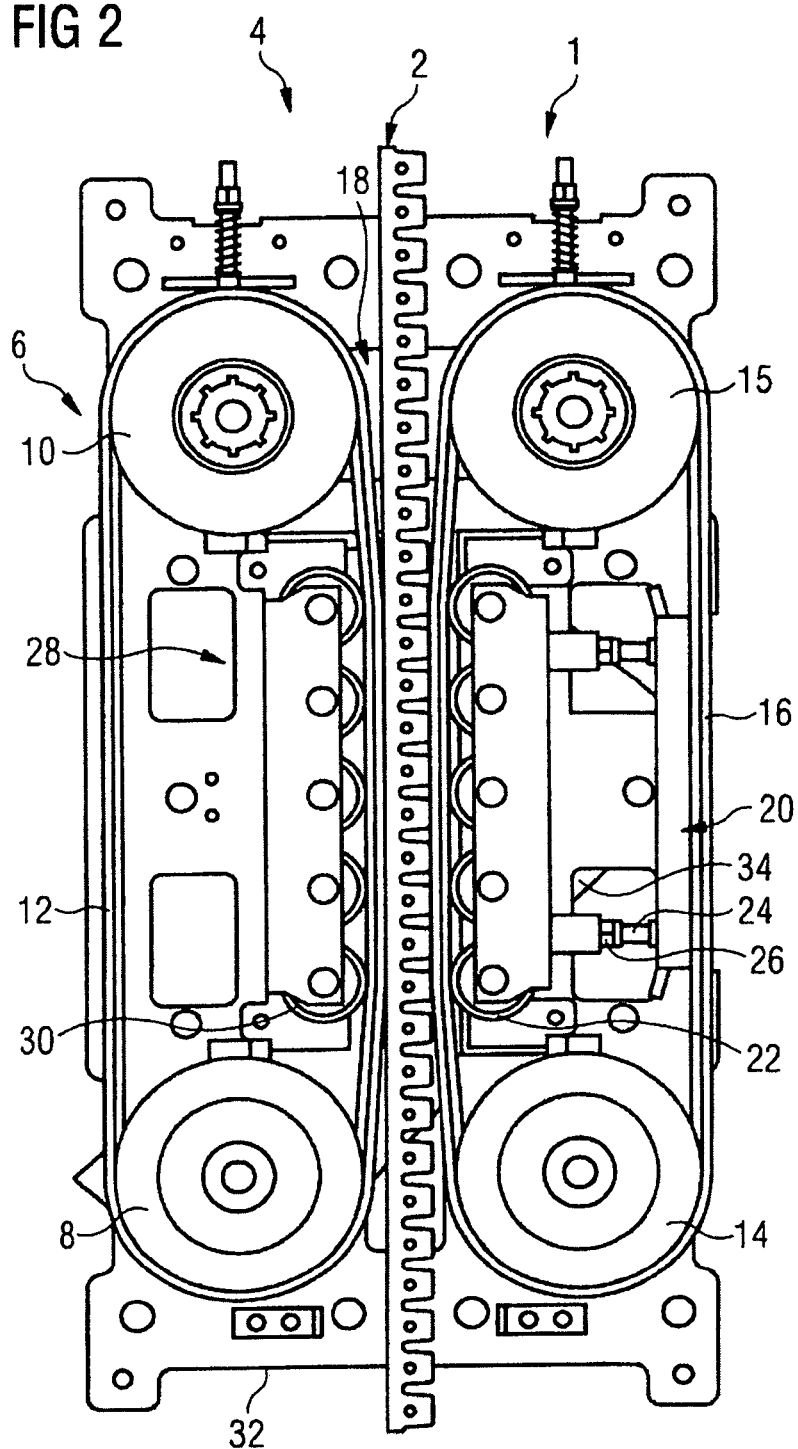
FIG. 2 is a top view of the conveying-cart drive according to the exemplary embodiment of FIG. 1.

With reference to FIG. 1 and FIG. 2, a drive device 1 and a portion of a drive element 2 which are contained in a conveying-cart drive 4 according to one exemplary embodiment of the invention are described below.

The drive device 1 may have a drive-force transmission means 6 formed as a belt drive, which contains on one drive side a drive roller 8, a drive-side deflecting roller 10 and a drive belt 12 which wraps around the drive roller 8 and the deflecting roller 10. On a pressure side, the drive-force transmission means 6 may contain two pressure-side deflecting rollers 14, 15 and a pressure belt 16 which wraps around the deflecting rollers 14, 15.

The drive belt 12 may be formed spaced apart from the pressure belt 16 such that a gap 18 is formed between the drive belt 12 and the pressure belt 16, in which the drive element 2 can be wedged for driving.

The clamping of the drive element 2 or the pressing of the drive element 2 against the drive belt 12 may take place by means of a pressure means 20 with adjustable pressure rollers 22. The pressure rollers 22 may be adjusted by way of threaded rods 24 with lock nuts 26. The normal force which can be applied to the pressure belt 16 by means of the pressure rollers 22 can thus press the drive element 2 against the drive belt 12, with the normal force being able to be absorbed by a counter-pressure means 28 with counter-pressure rollers 30. The counter-pressure rollers 30 for this may be at a fixed distance from the drive element 2 or a fixed axial distance from the drive roller 8.

The counter-pressure rollers 30 and the drive roller 8 and a deflecting roller 14 of the two pressure-side deflecting rollers 14, 15 may be mounted in fixed manner on a baseplate 32 of the drive device 1.

The pressure rollers 22 and the drive-side deflecting roller 10 and the other deflecting roller 15 of the pressure-side deflecting rollers 14, 15 may be mounted displaceably on the baseplate 32. The baseplate 32 may be mounted floating with the aid of low-friction plastics-material bars, in order to bring about uniform contact of the pressure rollers 22 with the pressure belt 16 as intermediate layer on the drive element 2, without running the risk of the baseplate 32 being able to tilt in its mounting. Thus the theoretically identical pressure force can be exerted on the drive element in the pressure direction by each of the pressure rollers 22. The pressure rollers 22 may be displaceable in the pressure direction onto the drive element 2 or counter to the pressure direction away from the drive element 2. The pressure-side deflecting roller 15 and the drive-side deflecting roller 10 may in each case act as a tensioning idler pulleys and be displaceable in the tensioning direction or counter to the tensioning direction of the drive belt 12 or of the pressure belt 16. The drive belt 12 and the pressure belt 16 may be formed as multi-rib belts, with which comparatively high forces can be transmitted while having a low overall height.

The drive roller 8 may, as in this exemplary embodiment, be driven by a drive source 34 formed as an electric motor, in particular as a bevel gear motor, which may be arranged on a side of the baseplate 32 opposite the drive roller 8.

Figure 3:
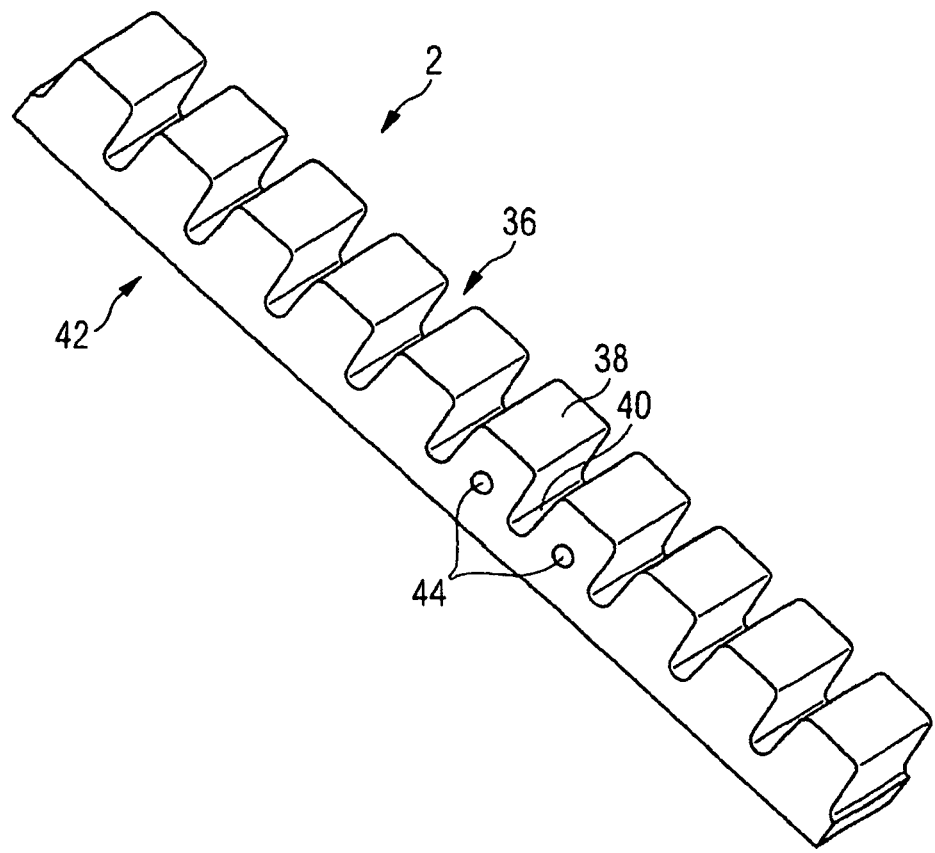
FIG. 3 is a spatial top view of a drive element according to one exemplary embodiment of the invention.
Figure 4:
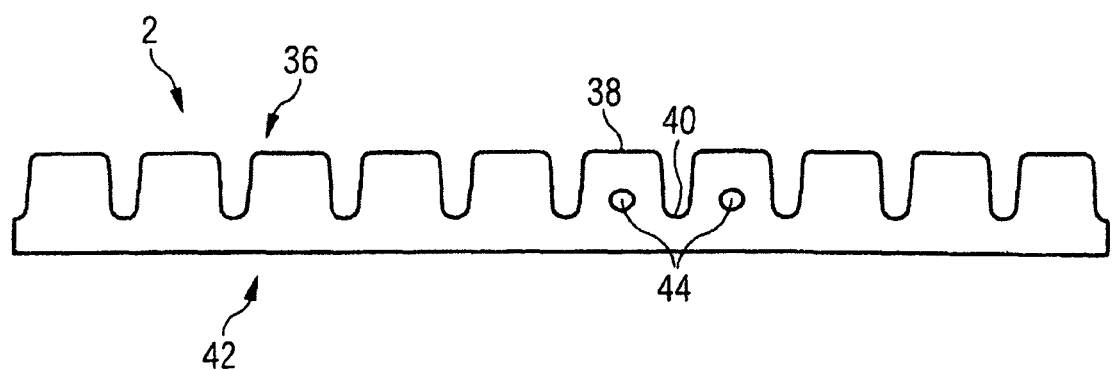
FIG. 4 is a side view of the drive element according to the exemplary embodiment of FIG. 3.

As illustrated in greater detail in FIG. 3 and FIG. 4, the drive element 2 may have a first long side 36 on which alternately transverse ribs 38 and transverse joints 40 are formed oriented transversely to the longitudinal direction of the drive element 2, i.e. in the extent of the width thereof. A second long side 42 of the drive element 2 formed opposite the first long side 36 may be formed substantially flat. As illustrated in this exemplary embodiment, the drive element 2 may be formed as a rubber block chain, consisting of individual blocks. The rubber block chain in this case has a smooth underside (second long side 42) which is directed towards the drive side, and an opposite upper side (first long side 36) having the free end of the ribs (transverse ribs 38), which upper side is directed towards the pressure side. The faces of the upper side and of the underside are parallel to each other and spaced apart from each other. Between these faces there are the side faces of the rubber block chain, which are likewise parallel to each other and spaced apart from each other. It goes without saying that the side faces may also run obliquely to each other.

On a lateral face of the drive element 2, there may be formed at least one receptacle 44 for a fastening means (not shown) for a conveying cart (not shown) which are formed in this exemplary embodiment as fastening holes. The fastening holes are preferably provided centrally in the respective transverse ribs 38.

As shown in FIG. 1 and FIG. 2, the second long side 42, i.e. the smooth underside, of the drive element 2 for driving the drive element 2 is oriented facing towards the drive belt 12 of the drive device 1.

With the arrangement or configuration of the conveying-cart drive 4 previously described, a force-locking or frictional-locking drive of the drive element 2 is realized by means of the drive device 1.

In this case, when a normal force is sufficiently applied to the drive belt 12 by the pressure rollers 22 and/or when there is a sufficient coefficient of friction for static friction of the drive belt 12 and/or of the pressure belt 16 together with the drive element 2, the drive force of the drive source 34 can be transmitted to the drive element 2 in force-locking manner or in frictional-locking manner by way of the drive roller 8 and the drive belt 12.

The conveying cart (not shown) connected to the drive element 2 can thus be reliably driven in the conveying device (not shown) for conveying conveyed material with the improved conveying-cart drive 4.

LIST OF REFERENCE CHARACTERS 1 drive device
2 drive element
4 conveying-cart drive
6 drive-force transmission means
8 drive roller
10 drive-side deflecting roller
12 drive belt
14 pressure-side deflecting roller
15 pressure-side deflecting roller
16 pressure belt
18 gap
20 pressure means
22 pressure roller
24 threaded rod
26 lock nut
28 counter-pressure means
30 counter-pressure roller
32 baseplate
34 drive source
36 first long side of the drive element
38 transverse rib
40 transverse joint
42 second long side of the drive element
44 receptacle

The invention claimed is:

1. A conveying-cart drive (4) having a drive device (1) for conveying a conveying cart of a conveying device, comprising:
   a drive source (34) for delivering a drive force;
   a drive-force transmission means (6) for a receiving the drive force of the drive source (34); and an elongate drive element (2) driven by the drive-force transmission means (6), the drive element (2) having opposite first and second long sides (36, 42), the first long side (36) having transverse ribs (38) and transverse joints (40) between the transverse ribs (38), the transverse ribs (38) and the transverse joints (40) being oriented transverse to a longitudinal direction of the elongate drive element (2) for permitting negotiating of curves by the elongate drive element (2), the second long side (42) of the elongate drive element (2) being substantially flat, wherein the drive element (2) is configured to have the conveying cart fastened to the drive element (2), and wherein the drive force can be transmitted from the drive-force transmission means (6) to the drive element (2) to drive the drive element (2) in the longitudinal direction by means of a frictional-locking connection between the drive-force transmission means (6) and the substantially flat second long side (42) of the drive element (2).

2. The conveying-cart drive (4) of claim 1, wherein the drive-force transmission means (6) is a belt drive that has a gap (18) formed between a drive belt (12) and a pressure belt (16), the drive element (2) being clamped in the gap (18) for driving.

3. The conveying-cart drive (4) of claim 1, wherein the drive-force transmission means (6) comprises:

a drive side with a drive roller (8), a deflecting roller (10), a drive belt (12) that wraps around the drive roller (8) and the deflecting roller (10), and a counter-pressure means (28) with counter-pressure rollers (30), and a pressure side with two deflecting rollers (14, 15), a pressure belt (16) that wraps around the deflecting rollers (14, 15) and a pressure means (20) with pressure rollers (22).

4. The conveying-cart drive (4) of claim 3, wherein the drive belt (12) and the pressure belt (16) are formed as multi-rib belts.

5. The conveying-cart drive (4) of claim 1, wherein multiple drive devices (1) are provided in the conveying device at predetermined distances from each other.

6. The conveying-cart drive (4) of claim 1, wherein at least one receptacle is formed on the drive element (2) for fastening the conveying cart to the drive element (2).

7. The conveying-cart drive (4) of claim 1, wherein the drive element (2) is a rubber block chain or a metal link chain.

8. The conveying-cart drive (4) of claim 1, wherein the drive-force transmission means (6) includes a drive belt (12) and the second long side (42) of the drive element (2) for driving the drive element (2) faces the drive belt (12).

9. The conveying-cart drive (4) of claim 8 wherein the drive belt (12) has a substantially flat outer surface disposed in surface contact with the substantially flat second long side (42) of the drive element (2).

\* \* \* \* \*